United States Patent
Jnanegowda et al.

(10) Patent No.: US 12,497,180 B2
(45) Date of Patent: Dec. 16, 2025

(54) OFF-WING EVACUATION PACKBOARD COVER PANEL AND SOFT COVER RELEASE UTILIZING MAGNETOSTRICTION

(71) Applicant: GOODRICH CORPORATION, Charlotte, NC (US)

(72) Inventors: Vasantha Kumara Jnanegowda, Bangalore (IN); Sunil Deshapande, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 525 days.

(21) Appl. No.: 17/985,391

(22) Filed: Nov. 11, 2022

(65) Prior Publication Data

US 2024/0083587 A1   Mar. 14, 2024

(30) Foreign Application Priority Data

Sep. 9, 2022   (IN) .............................. 202241051631

(51) Int. Cl.
*B64D 25/14*   (2006.01)
*B64D 25/18*   (2006.01)

(52) U.S. Cl.
CPC .............. *B64D 25/14* (2013.01); *B64D 25/18* (2013.01)

(58) Field of Classification Search
CPC .......... B64D 25/14; B64D 25/18; A62B 1/20; B63C 9/22
See application file for complete search history.

(56) References Cited

U.S. PATENT DOCUMENTS

| | | | |
|---|---|---|---|
| 7,380,755 B2 | 6/2008 | Matsch | |
| 9,416,805 B2 | 8/2016 | Cascolan et al. | |
| 10,472,076 B2 | 11/2019 | Schmidt et al. | |
| 2005/0001704 A1 | 1/2005 | Maruyama | |
| 2006/0266888 A1* | 11/2006 | Matsch | B64D 25/14 244/905 |

(Continued)

FOREIGN PATENT DOCUMENTS

CN   210027936   2/2020

OTHER PUBLICATIONS

European Patent Office, European Search Report dated Oct. 30, 2023 in Application No. 23195535.2.

*Primary Examiner* — Gisele D Ford
(74) *Attorney, Agent, or Firm* — SNELL & WILMER L.L.P.

(57) ABSTRACT

A system for releasing a blowout panel and softcover release of an evacuation slide in an aircraft is provided. The system includes a first actuator, a second actuator; and a controller. The controller is configured to receive an indication that an evacuation event has begun; and, responsive to receiving the indication of the evacuation event beginning: send a first signal to the first actuator that magnetizes a first magnetostriction material within the first actuator, thereby releasing the blowout panel of a packboard compartment in which the evacuation slide is present; and send a second signal to the second actuator that magnetizes a second magnetostriction material within the second actuator, thereby releasing a key-loop of lacing associated with the softcover in which the evacuation slide is present in the packboard compartment.

18 Claims, 12 Drawing Sheets

(56) References Cited

U.S. PATENT DOCUMENTS

| | | | |
|---|---|---|---|
| 2011/0139934 A1* | 6/2011 | Giesa | B64D 25/14 |
| | | | 244/137.2 |
| 2016/0311543 A1* | 10/2016 | Schmidt | F15B 15/14 |
| 2018/0210483 A1* | 7/2018 | Santiago | B64D 25/16 |
| 2020/0010204 A1 | 1/2020 | Haynes et al. | |
| 2021/0025212 A1* | 1/2021 | Markmiller | E05B 47/0001 |
| 2021/0230906 A1 | 7/2021 | Haynes et al. | |
| 2021/0325000 A1* | 10/2021 | Laguduwa | F17C 13/025 |

\* cited by examiner

OFF-WING EVACUATION PACKBOARD COVER PANEL AND SOFT COVER RELEASE UTILIZING MAGNETOSTRICTION

CROSS-REFERENCE TO RELATED APPLICATIONS

This application claims priority to, and the benefit of, India Patent Application No. 202241051631 (DAS CODE: A8B4), filed Sep. 9, 2022, and titled "OFF-WING EVACUATION PACKBOARD COVER PANEL AND SOFT COVER RELEASE UTILIZING MAGNETOSTRICTION," which is incorporated by reference herein in its entirety for all purposes.

FIELD

The present disclosure relates to systems and methods for off-wing evacuation systems, and more specifically, to utilizing magnetostriction to control a packboard cover and softcover release of an aircraft.

BACKGROUND

Aircraft emergency landings often demand rapid evacuation of passengers from the aircraft due to potential injuries from fire, explosions, and sinking in water. Quickly evacuating passengers from an aircraft is performed with multiple emergency exits, each equipped with evacuation slides or slides/rafts. Evacuation slides or slides/rafts are needed to comply with aviation regulation and to ensure the safe evacuation of all passengers.

These evacuation slides or slides/rafts are normally stored in an uninflated condition in a packboard that occupies a small space in the interior of the aircraft. Door exit inflatable slides are typically mounted on the interior of the aircraft door or immediately adjacent to it. Over wing exits are normally stored in an uninflated condition in a special packboard compartment that opens to the exterior of the aircraft adjacent the over wing exit. The packboard compartment is closed by means of a packboard cover, hereinafter referred to as a blowout panel, that fits flush with and blends smoothly into the contours of an exterior of the aircraft. The blowout panel is retained to the packboard compartment by means of a plurality of releasable ball locks. Opening an aircraft emergency evacuation exit in an armed condition releases the releasable ball locks, allowing the blowout panel to fall away/unlock. Simultaneously, the emergency evacuation slide is inflated and extends to its deployed condition ready for evacuation of passengers.

SUMMARY

According to various embodiments of the present disclosure, a system for releasing a blowout panel and softcover release of an evacuation slide in an aircraft is provided. The system includes a first actuator; a second actuator; and a controller, where the controller is configured to: receive an indication that an evacuation event has begun; and, responsive to receiving the indication of the evacuation event beginning: send a first signal to the first actuator that magnetizes a first magnetostriction material within the first actuator, thereby releasing the blowout panel of a packboard compartment in which the evacuation slide is present; and send a second signal to the second actuator that magnetizes a second magnetostriction material within the second actuator, thereby releasing a key-loop of lacing associated with the softcover in which the evacuation slide is present in the packboard compartment.

In various embodiments, the first actuator is a set of first actuators. In various embodiments, the first actuator includes: the first magnetostriction material; a spindle; and a set of ball bearings, where the first magnetostriction material, when magnetized, expands along a length of the first magnetostriction material in a first direction forcing the spindle to translate in the first direction thereby allowing the set of ball bearings holding the blowout panel in place to translate in a second direction perpendicular to the first direction thereby releasing the blowout panel. In various embodiments, the first actuator further includes a compression spring, where the compression spring provides a compression spring force that holds the spindle against the first magnetostriction material. In various embodiments, the first actuator further includes a solenoid, where the solenoid generates a magnetic field in response to receiving the first signal and where the magnetic field magnetizes the first magnetostriction material thereby expanding the first magnetostriction material along the length of the first magnetostriction material in the first direction. In various embodiments, the first signal is a direct current signal.

In various embodiments, the second actuator includes: the second magnetostriction material; and a spindle, where the second magnetostriction material, when magnetized, expands along a length of the second magnetostriction material in a first direction forcing the spindle to translate in the first direction thereby pulling the key-loop of the lacing coupled to the spindle. In various embodiments, the second actuator further includes a compression spring, where the compression spring provides a compression spring force that holds the spindle against the second magnetostriction material. In various embodiments, the second actuator further includes a solenoid, where the solenoid generates a magnetic field in response to receiving the second signal and where the magnetic field magnetizes the second magnetostriction material thereby expanding the second magnetostriction material along the length of the second magnetostriction material in the first direction. In various embodiments, the second signal is a direct current signal.

Also disclosed herein is a control system for releasing a blowout panel and softcover release of an evacuation slide in an aircraft. The control system includes: a first actuator; a second actuator; and a controller coupled to the first actuator and the second actuator; and a tangible, non-transitory memory configured to communicate with the controller, the tangible, non-transitory memory having instructions stored thereon that, in response to execution by the controller, cause the controller to perform operations including: receiving an indication that an evacuation event has begun; and, responsive to receiving the indication of the evacuation event beginning: sending a first signal to the first actuator that magnetizes a first magnetostriction material within the first actuator, thereby releasing the blowout panel of a packboard compartment in which the evacuation slide is present; and sending a second signal to the second actuator that magnetizes a second magnetostriction material within the second actuator, thereby releasing a key-loop of lacing associated with the softcover in which the evacuation slide is present in the packboard compartment.

In various embodiments, the first actuator is a set of first actuators. In various embodiments, the first actuator including: the first magnetostriction material; a spindle; and a set of ball bearings, where the first magnetostriction material, when magnetized, expands along a length of the first magnetostriction material in a first direction forcing the spindle to translate in the first direction thereby allowing the set of ball bearings holding the blowout panel in place to translate in a second direction perpendicular to the first direction thereby releasing the blowout panel. In various embodiments, the first actuator further includes a compression spring, where the compression spring provides a compression spring force that holds the spindle against the first magnetostriction material. In various embodiments, the first actuator further includes a solenoid, where the solenoid generates a magnetic field in response to receiving the first signal and where the magnetic field magnetizes the first magnetostriction material thereby expanding the first magnetostriction material along the length of the first magnetostriction material in the first direction.

In various embodiments, the second actuator includes: the second magnetostriction material; and a spindle, where the second magnetostriction material, when magnetized, expands along a length of the second magnetostriction material in a first direction forcing the spindle to translate in the first direction thereby pulling the key-loop of the lacing coupled to the spindle. In various embodiments, the second actuator further includes a compression spring, where the compression spring provides a compression spring force that holds the spindle against the second magnetostriction material. In various embodiments, the second actuator further includes a solenoid, where the solenoid generates a magnetic field in response to receiving the second signal and where the magnetic field magnetizes the second magnetostriction material thereby expanding the second magnetostriction material along the length of the second magnetostriction material in the first direction. In various embodiments, the first signal and the second signal are direct current signals.

Also disclosed herein is a method for releasing a blowout panel and softcover release of an evacuation slide in an aircraft. The method includes, the method including receiving, by a controller, an indication that an evacuation event has begun; and, responsive to receiving the indication of the evacuation event beginning: sending, by the controller, a first signal to a first actuator that magnetizes a first magnetostriction material within the first actuator, thereby releasing the blowout panel of a packboard compartment in which the evacuation slide is present; and sending, by the controller, a second signal to a second actuator that magnetizes a second magnetostriction material within the second actuator, thereby releasing a key-loop of lacing associated with the softcover in which the evacuation slide is present in the packboard compartment.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Existing evacuation slide release systems for the blowout panel and soft cover include a gas delivery manifold. The release source is pressurized gas from reservoir tank stored along with packboard compartment and the pressurized gas is configured to flow into delivery manifolds in response to an evacuation event. The ball locks associated with the blowout panel are configured to release the blowout panel and actuator pins associated with the softcover are configured to release the softcover covering the evacuation slide or slide/raft within the packboard compartment in response to pressurized gas flow to from the gas delivery manifolds.

However, future evacuation slide release systems may be configured to run on electricity instead of using compressed gas and sub-systems within the aircraft are planned to operate via an electric source, which means that gas delivery manifold release systems for blowout panels and soft covers needs to be replaced. Disclosed herein is a system and method for utilizing magnetostriction to control a packboard cover and softcover release of an aircraft. The system and method disclosed herein uses a magnetostriction component which has the property of ferromagnetic (materials that causes the magnetostriction component to change their shape or dimensions during the process of magnetization) and generates the magnetic field when electrically energized to achieve the functionality of the ball locks and actuator pins release system to replace the existing gas-based delivery manifold release system.

Figure 1:
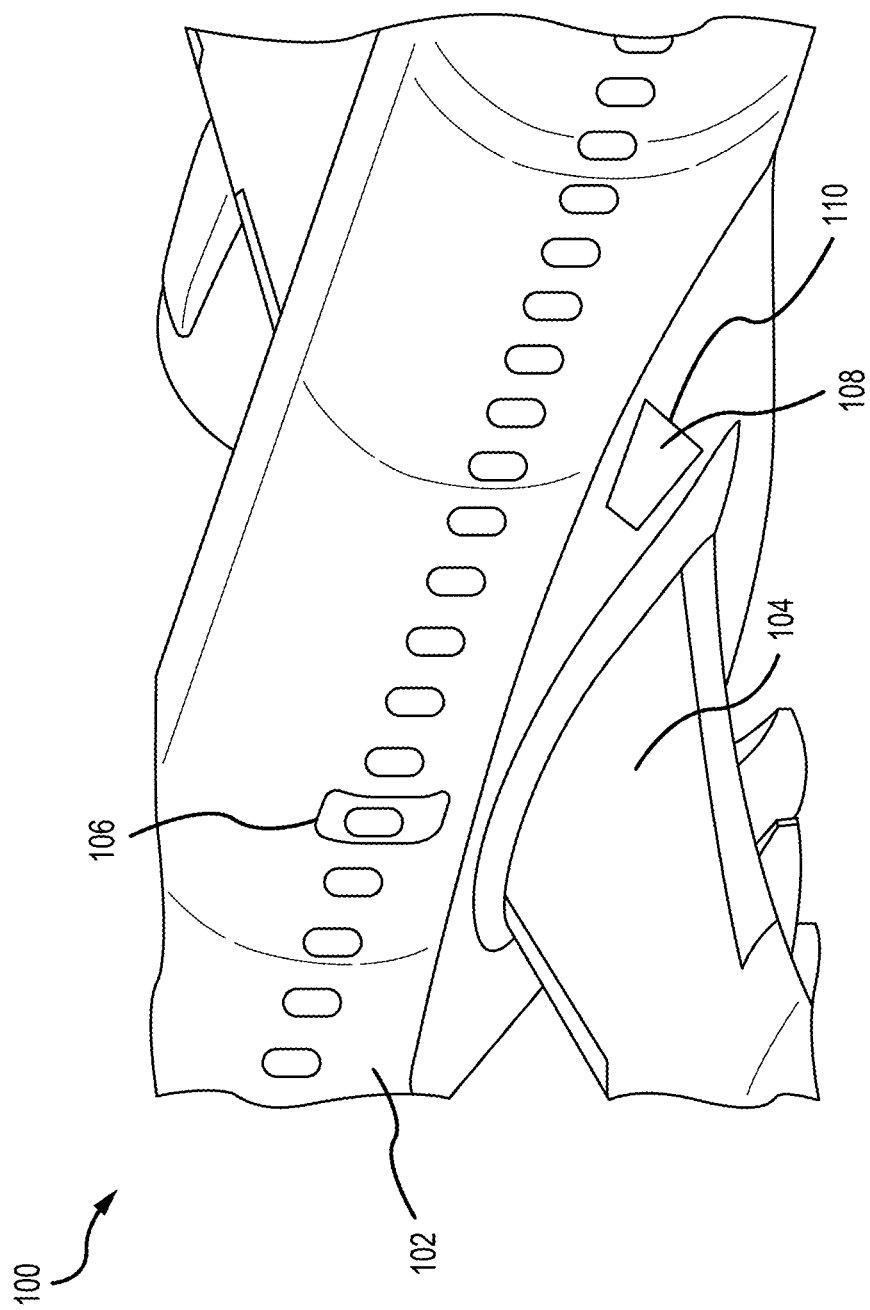
FIG. 1 illustrates an aircraft, in accordance with various embodiments.

Referring now to FIG. 1, in accordance with various embodiments, an exemplary aircraft is illustrated. The aircraft 100 may include comprise a fuselage 102 with wings 104 fixed to fuselage 102. Emergency exit door 106 may be disposed on the fuselage 102 over the wings 104 such that passengers exiting emergency exit door 106 would exit onto wings 104. An evacuation slide assembly 108 may be disposed aft of emergency exit door 106. Blowout panel 110 may cover evacuation slide assembly 108 when installed on the aircraft 100. In various embodiments, the evacuation slide assembly 108 may include and/or be housed within a packboard compartment to the aircraft 100.

The evacuation slide assembly 108 may jettison the blowout panel 110 and deploy an evacuation slide, such as an inflatable slide, in response to an activated emergency exit door 106 opening or in response to another evacuation event. The evacuation slide may be packed within and/or otherwise stored and/or retained within a soft cover. As described in greater detail below, the evacuation slide assembly 108 may include a release system that facilitates the deployment of the evacuation slide and the release of both the blowout panel 110 and the soft cover. In various embodiments, as described in greater detail below, the release system may be actuated using a single power source, such as a magnetostriction component. In various embodiments, actuation of the release system, and thus deployment of the evacuation slide and the deployment/release of both the blowout panel 110 and the soft cover, may be non-electrically actuated.

Figure 2:
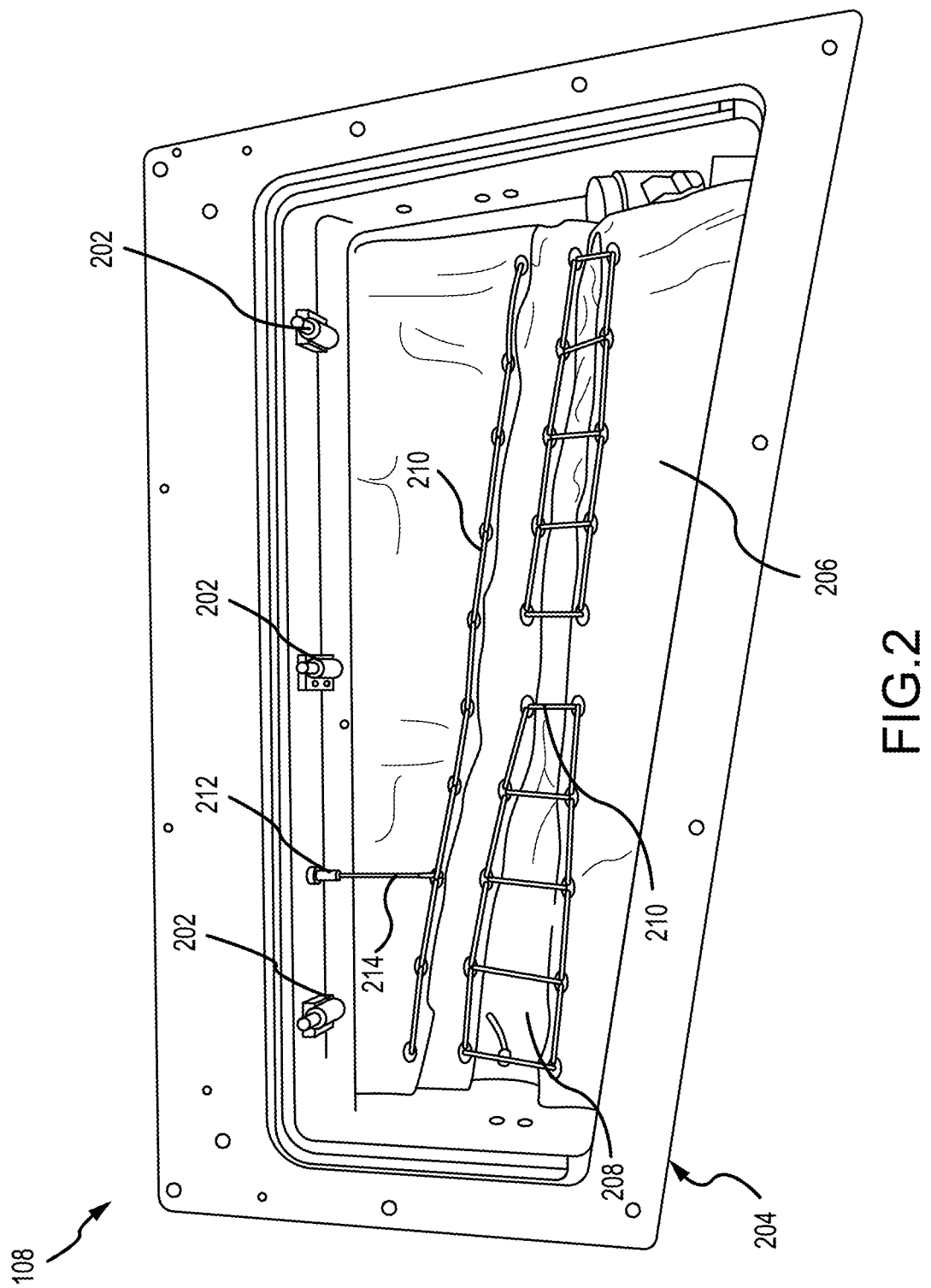
FIG. 2 illustrates an evacuation slide assembly, in accordance with various embodiments.

Referring now to FIG. 2, in accordance with various embodiments, an evacuation slide assembly is illustrated. In various embodiments, a first actuator 202 is configured to release the blowout panel 110 of the evacuation slide assembly 108 of FIG. 1 in response to an evacuation event. That is, according to various embodiments, the blowout panel 110 may be at least partially retained in place by the first actuator 202 until an evacuation event. In response to the evacuation event, the first actuator 202 may release the blowout panel 110, thus allowing the blowout panel 110 to be jettisoned, in accordance with various embodiments. In various embodiments, the act of jettisoning of the blowout panel 110 may be accomplished indirectly via inflation of the evacuation slide.

In various embodiments, the first actuator 202 may include multiple actuators spaced apart from each other and distributed along a length of the packboard compartment 204. In various embodiments, the first actuator 202 or first actuators may be ball locks. The ball locks may engage a lip or other surface of the blowout panel 110 and thus may securely retain, or at least facilitate retaining, the blowout panel 110 in place over an opening to the packboard compartment 204. In response to an evacuation event, the first actuator 202 or first actuators release the blowout panel 110.

The packboard compartment 204 may include comprise a soft cover 206 containing evacuation slide 208. Soft cover 206 may have lacing 210 to enclose the soft cover 206 and to retain the evacuation slide 208. The lacing 210 may be in a daisy chain or speed lacing configuration. The lacing 210 may have a key-loop that, once released or unlocked, allows the remainder of the lacing 210 to be unfurled. Thus, in response to releasing the key-loop, the evacuation slide 208 may be released (or may at least be releasable).

In various embodiments, a second actuator 212 may be coupled to the lacing 210 and motivation of the second actuator 212, in response to an evacuation event, may unlock the key-loop or other such feature of the lacing 210, thereby allowing the lacing 210 to be unfurled. In various embodiments, the lacing 210 may include a pin that locks the key-loop. The pin may be slidably coupled to the lacing 210 and may be coupled to the second actuator 212. Movement of the second actuator 212 may cause the pin 214 to translate or slide into the second actuator 212, thus unlocking the lacing 210.

The second actuator 212 may also include an arm that is configured to couple to the key-loop or pin of the lacing 210. The arm of the second actuator 212 may be in an extended position when an evacuation event is not occurring or when the evacuation system is disarmed. When the evacuation system is armed, in response to an evacuation event, the arm of the second actuator 212 retracts into a housing, thus sliding the pin or otherwise unlocking the key-loop of the lacing 210 to allow the lacing 210 to unfurl and release the evacuation slide 208 from the soft cover 206.

Figure 3:
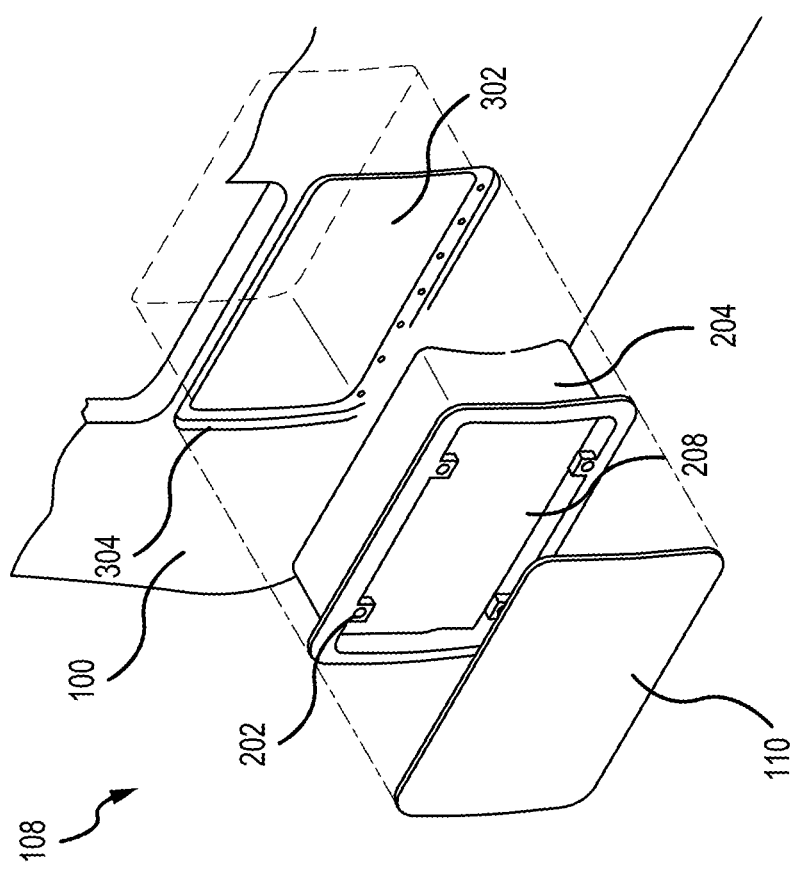
FIG. 3 illustrates an evacuation slide assembly, in accordance with various embodiments.

Referring now to FIG. 3, an evacuation slide assembly is illustrated. The evacuation slide assembly 108 includes includes the evacuation slide 208 stored in an uninflated condition within a packboard compartment 204. The packboard compartment 204 itself is secured within a recess 302 in the outer hull of the aircraft 100 and covered by the blowout panel 110 that is seated in reveal 304 so that the blowout panel 110 is flush with and conforms to the general contour of the outer hull of aircraft 100. The blowout panel 110 is secured to packboard compartment 204 by means of a first actuator 202 or set of first actuators the operation of which is explained more fully hereinafter.

Figure 4:
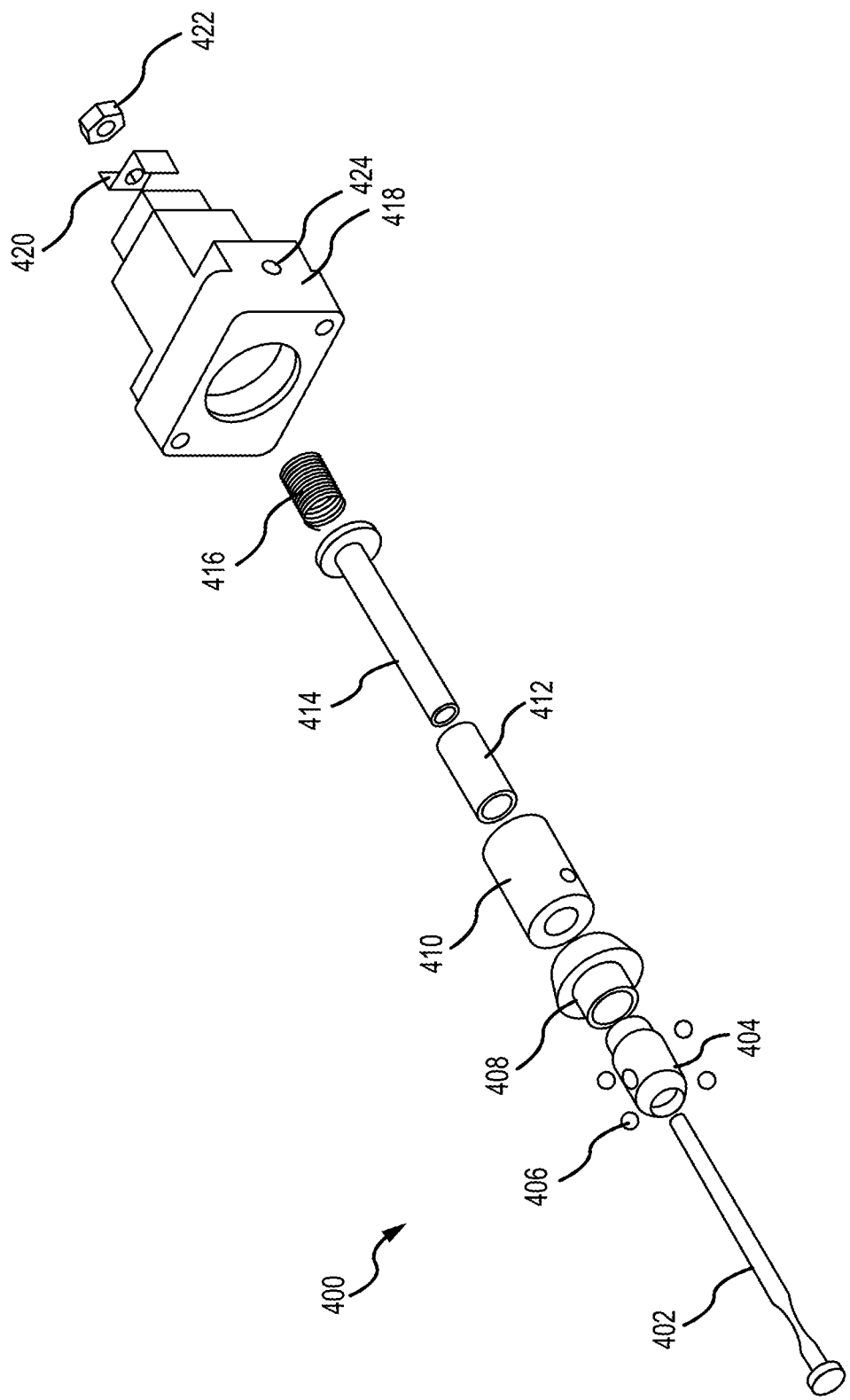
FIG. 4 illustrates an exploded isometric view of the components of a ball lock assembly that includes a magnetostriction component, in accordance with various embodiments.

Referring now to FIG. 4, in accordance with various embodiments, an exploded isometric view of the components of a ball lock assembly that includes a magnetostriction component is illustrated. In various embodiments, the ball lock assembly 400 of FIG. 4 may be a first actuator such as the first actuator 202 of FIG. 2. In various embodiments, the ball lock assembly 400 includes a frangible rod 402, a nose 404, ball bearings 406, a nose fitting 408, a magnetostrictive housing 410, a drive rod 412, a spindle 414, a compression spring 416, an actuator housing 418, a washer 420, and a nut 422. In various embodiments, the magnetostrictive housing 410 includes a direct current solenoid that is coupled to a controller via an electrical cable connection 424. In various embodiments, the drive rod 412, which is configured to fit within the magnetostrictive housing 410, is comprised of the magnetostriction component. In various embodiments, the magnetostriction component is a ferromagnetic material such as Terfenol-D (an alloy including Terbium, Dysprosium, and Iron), Nickel, Alfer (Fe—Al alloy), Permalloy (Fe—Ni alloy), Cobalt-Nickel (Co—Ni alloy), Permendur (Co—Fe—V alloy); Cobalt Ferrite ($CoFe_2O_4$), Nickel Ferrite ($NiFe_2O_4$), the preceding with or without various rare earths and their alloys and compounds, among others. In various embodiments, the magnetostriction component has the property of a material that causes the material to change shape or dimensions during the process of magnetization. In various embodiments, in response to the controller, which is configured to provide a direct current signal to the direct current solenoid of the magnetostrictive housing 410 via the electrical cable connection 424, providing a direct current signal to the direct current solenoid, a magnetic field is generated that causes the drive rod 412 to change shape or dimensions.

Figure 5:
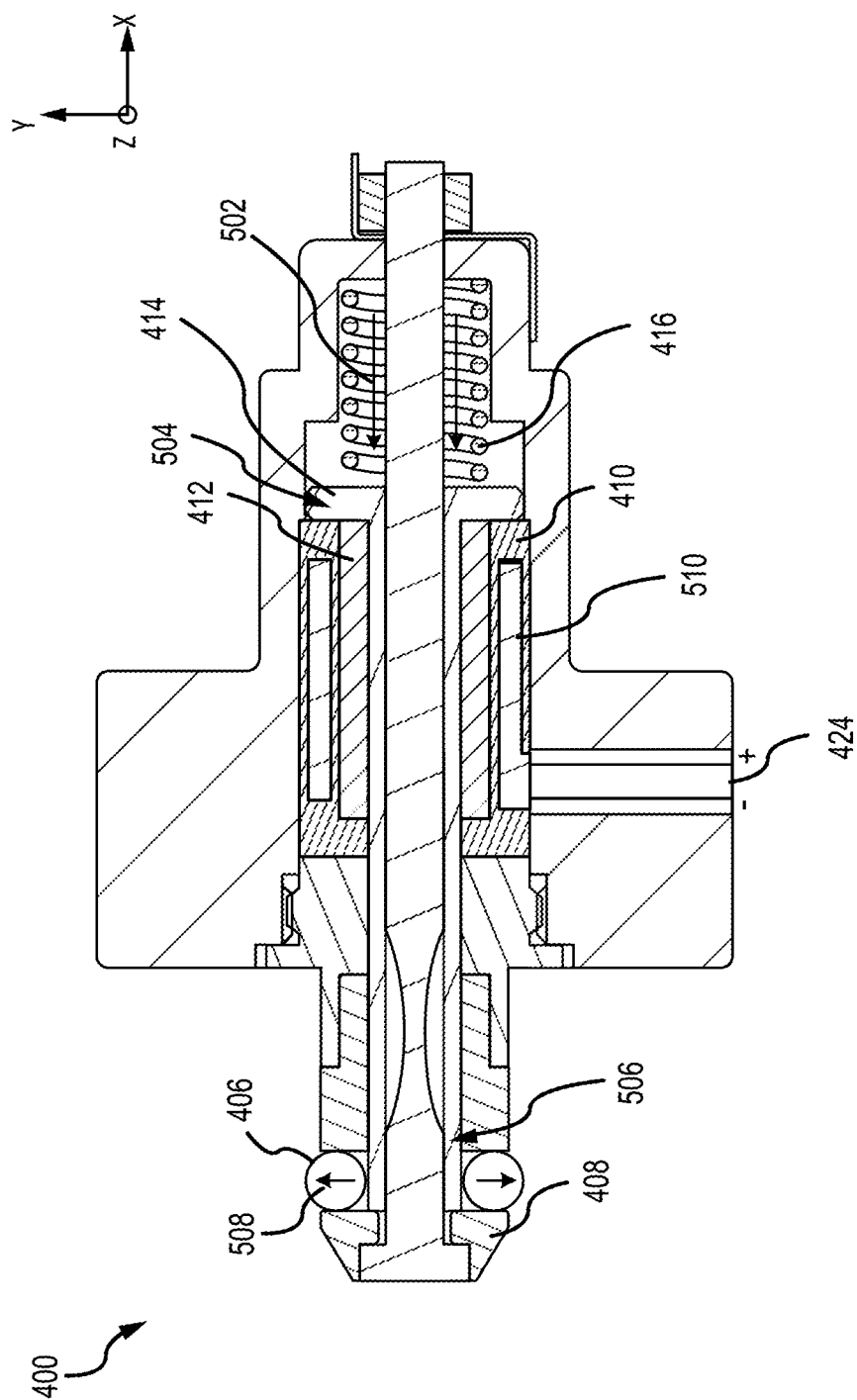
FIG. 5 illustrates a cross-sectional view of a ball lock assembly in a locked state, according to various embodiments.

Referring now to FIG. 5, in accordance with various embodiments, a cross-sectional view of a ball lock assembly in a locked state is illustrated. In various embodiments, the spindle 414 of the ball lock assembly 400 comprises a proximal end 504 and a distal end 506. In various embodiments, in the locked state, the compression spring 416 is in a default length state that applies a compression spring force 502 in a first direction, i.e., in a negative x-direction, to a first face of the proximal end 504 of the spindle 414. In various embodiments, the compression spring force 502 forces the distal end 506 of the spindle 414 to abut the nose fitting 408 which forces ball bearings 406 in an outward direction 508, i.e., a positive and negative y-direction. In various embodiments, the drive rod 412 abuts a second face of the proximal end 504 of the spindle 414. In various embodiments, the magnetostriction material of the drive rod 412 is not exposed to a magnetic field from the direct current solenoid 510 within the magnetostrictive housing 410 due to no electrical signal being provided via the electrical cable connection 424 by the controller. In that regard, the magnetostriction material of the drive rod 412 is not electrically energized and in a non-magnetic phase. Accordingly, in various embodiments, a structure of the magnetostriction material of the drive rod 412 is randomly oriented and does not change its shape. In that regard, the length of the drive rod 412 does not change during non-magnetic phase and the spindle 414 stays in specified position due to the compression spring force 502 and ensures that ball bearings 406 protrude outside the periphery of the nose fitting 408. Thus, the ball lock assembly 400 retains the blowout panel 110 of FIG. 1 within the desired position.

Figure 6:
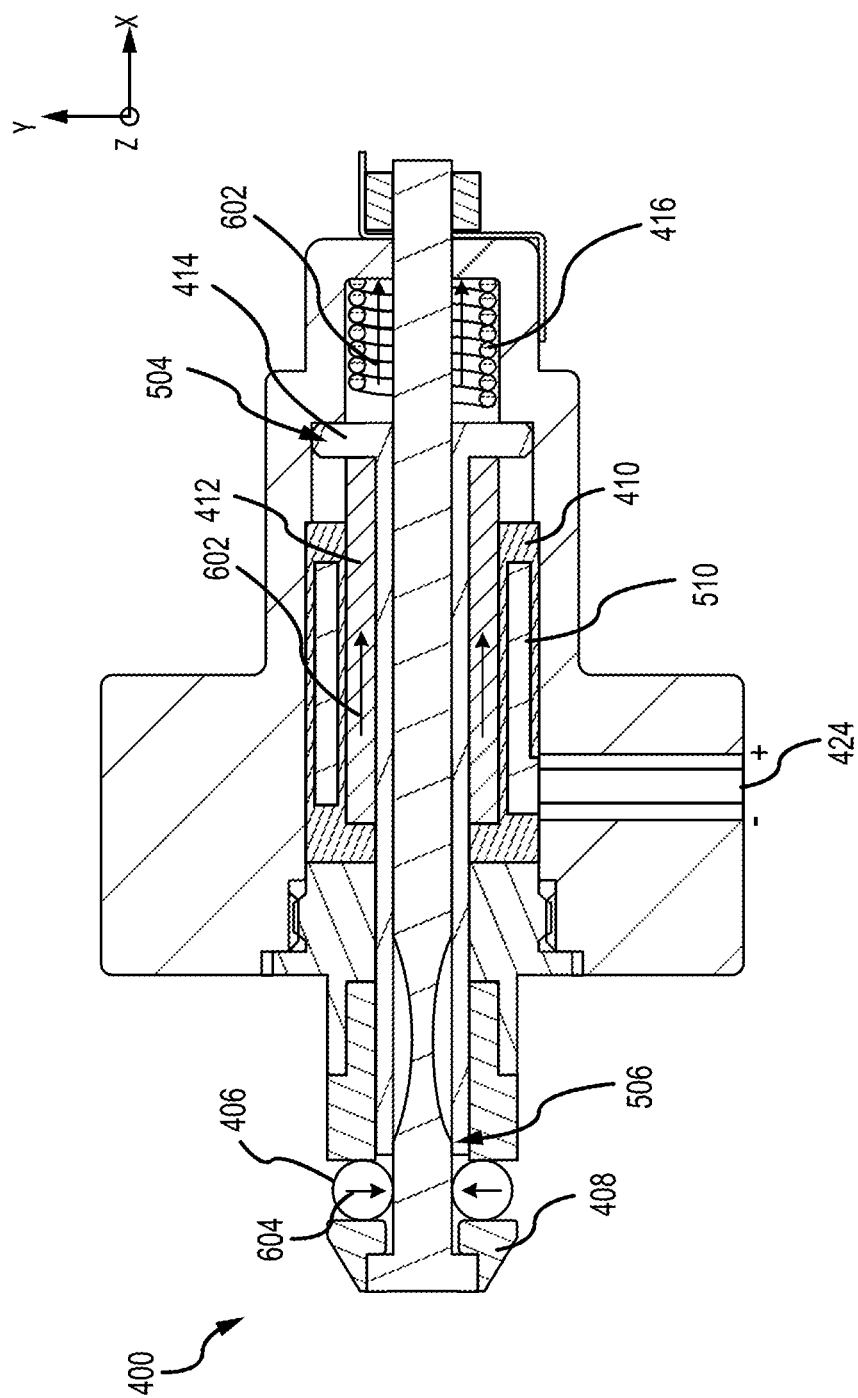
FIG. 6 illustrates a cross-sectional view of a ball lock assembly in an unlocked/released state, according to various embodiments.

Referring now to FIG. 6, in accordance with various embodiments, a cross-sectional view of a ball lock assembly in an unlocked/released state is illustrated. In various embodiments, in the unlocked/released state of the ball lock assembly 400, the controller is configured to provide an electrical signal to the direct current solenoid 510 within the magnetostrictive housing 410 via the electrical cable connection 424. In various embodiments, with the provided electrical signal, the direct current solenoid 510 generates a magnetic field onto the drive rod 412. In various embodiments, during the magnetic field phase, a structure of the magnetostriction material in the drive rod 412 changes orientation. In various embodiments, the orientation change imposed by the magnetic field generated by the direct current solenoid 510 creates a strain field in the magnetostriction material of the drive rod 412 and, as the intensity of the magnetic field is increased, more and more magnetic domains of magnetostriction material orientate themselves so that their principle axes of anisotropy are collinear with the magnetic field in each region and finally saturation is achieved. In various embodiments, the effect of this material property change in the magnetostriction material of the drive rod 412 during magnetic field phase causes the drive rod 412 to increase in length in a second direction 602 opposite to the compression spring force 502 of FIG. 5, i.e., in a positive x-direction, which increases a length of the drive rod 412 from its original length by reducing its diameter respectively.

In various embodiments, the elongation of the drive rod 412 in the second direction 602 causes the drive rod 412, which abuts the second face of the proximal end 504 of the spindle 414, to force the spindle 414 to translate in the second direction 602, i.e., in the positive x-direction, which compresses the compression spring 416 in the second direction 602, i.e., in the positive x-direction. In that regard, the longitudinal strain of in the magnetostriction material of the drive rod 412 produces the tensile force which creates the pushing force on the second face of the proximal end 504 of the spindle 414. Accordingly, due to this push force from drive rod 412, the proximal end 504 of the spindle 414 translates towards the compression spring 416 due to increase length of the drive rod 412. In various embodiments, the increased length of drive rod 412 generates a force that is higher than the compression spring force 502 such that the distal end 506 of the spindle 414 gradually moves away from a position of the ball bearings 406. In that regard, the displacement of the spindle 414 allows the ball bearings 406 to retract in an inward direction 604 opposite the outward direction 508 of FIG. 5, i.e., a negative and positive y-direction, to inside the periphery of the nose fitting 408. Accordingly, this process allows the blowout panel 110 of FIG. 1 to release from its locked position as the ball bearings 406 being retracted provides space for cover panel to move from a locked position.

Figure 7:
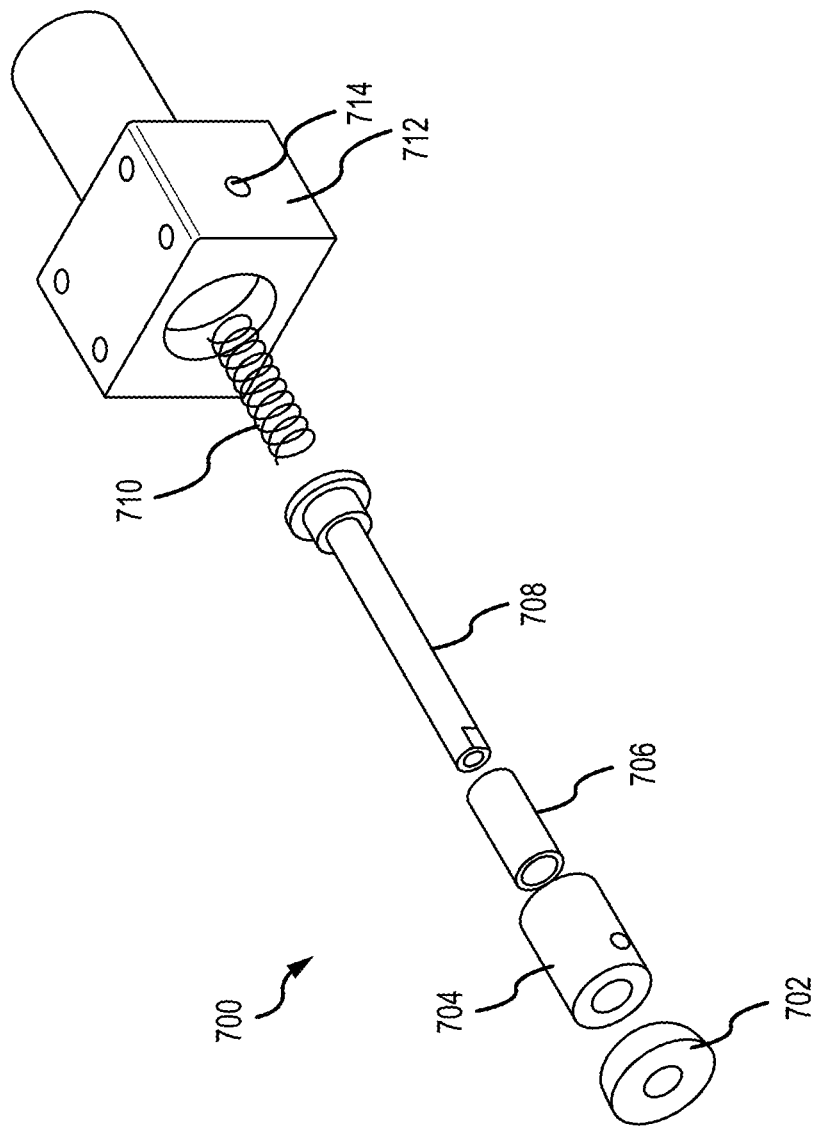
FIG. 7 illustrates an exploded isometric view of the components of a pull pin assembly for soft cover release that includes a magnetostriction component, according to various embodiments.

Referring now to FIG. 7, in accordance with various embodiments, an exploded isometric view of the components of a pull pin assembly for soft cover release that includes a magnetostriction component is illustrated. In various embodiments, the pull pin assembly 700 of FIG. 7 may be a second actuator such as the second actuator 212 of FIG. 2. In various embodiments, the pull pin assembly 700 includes a nose fitting 702, a magnetostrictive housing 704, a drive rod 706, a spindle 708, a compression spring 710, and an actuator housing 712. In various embodiments, the magnetostrictive housing 704 includes a direct current solenoid that is coupled to a controller via an electrical cable connection 714. In various embodiments, the drive rod 706, which is configured to fit within the magnetostrictive housing 704, is comprised of the magnetostriction component. In various embodiments, the magnetostriction component is a ferromagnetic material such as Terfenol-D (an alloy including Terbium, Dysprosium, and Iron), Nickel, Alfer (Fe—Al alloy), Permalloy (Fe—Ni alloy), Cobalt-Nickel (Co—Ni alloy), Permendur (Co—Fe—V alloy); Cobalt Ferrite ($CoFe_2O_4$), Nickel Ferrite ($NiFe_2O_4$), the preceding with or without various rare earths and their alloys and compounds, among others. In various embodiments, the magnetostriction component has the property of a material that causes the material to change shape or dimensions during the process of magnetization. In various embodiments, in response to the controller, which is configured to provide a direct current signal to the direct current solenoid of the magnetostrictive housing 704 via the electrical cable connection 714, providing a direct current signal to the direct current solenoid, a magnetic field is generated that causes the drive rod 706 to change shape or dimensions.

Figure 8:
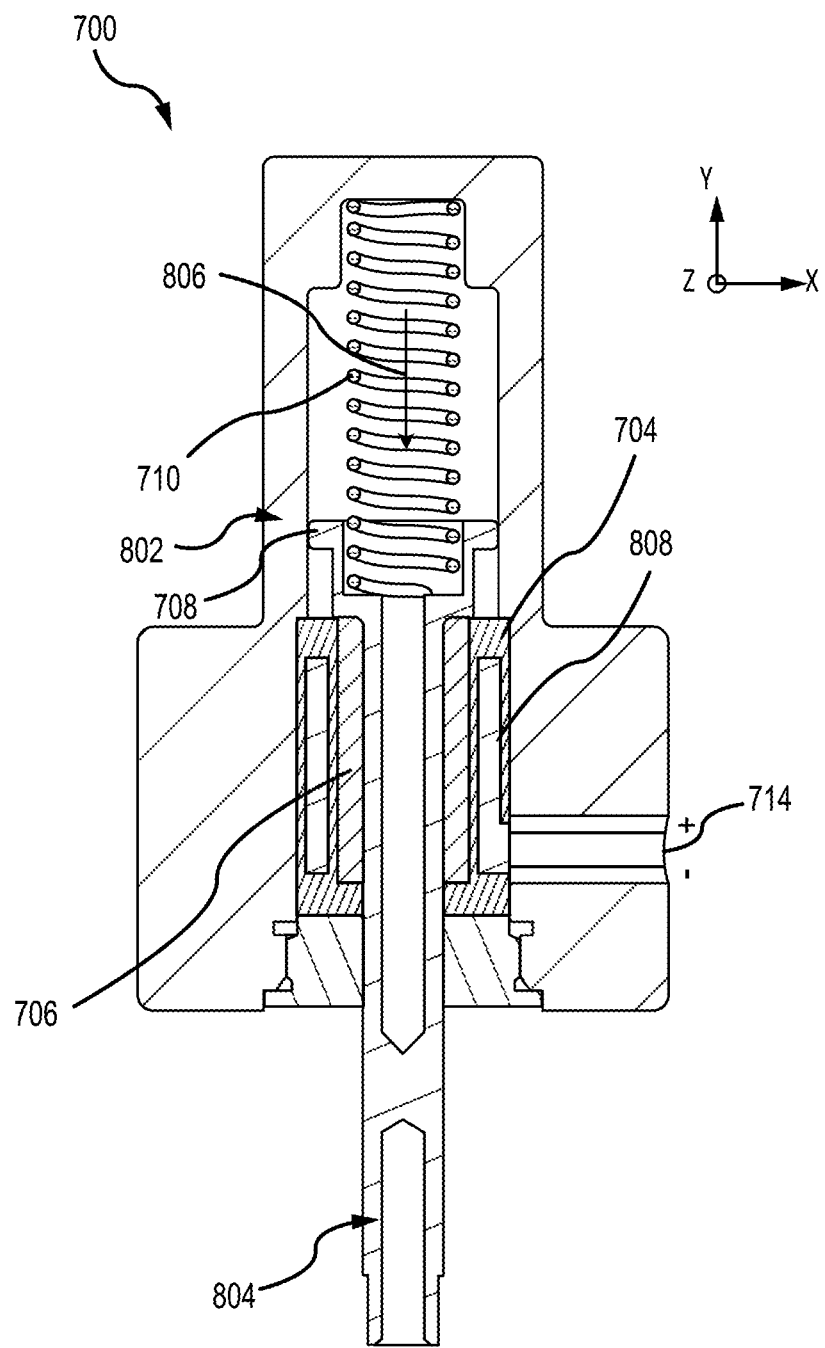
FIG. 8 illustrates a cross-sectional view of a pull pin assembly in a locked state, according to various embodiments.

Referring now to FIG. 8, in accordance with various embodiments, a cross-sectional view of a pull pin assembly in a locked state is illustrated. In various embodiments, the spindle 708 of the pull pin assembly 700 comprises a proximal end 802 and a distal end 804. In various embodiments, in the locked state, the compression spring 710 is in a default length state that applies a compression spring force 806 in a first direction, i.e., in a negative y-direction, to a first face of the proximal end 802 of the spindle 708. In various embodiments, the compression spring force 806 forces a second face of the proximal end 802 of the spindle 708 to abut a first end of the drive rod 706. In various embodiments, the magnetostriction material of the drive rod 706 is not exposed to a magnetic field from a direct current solenoid 808 within the magnetostrictive housing 704 due to no electrical signal being provided via the electrical cable connection 714 by the controller. In that regard, the magnetostriction material of the drive rod 706 is not electrically energized and in a non-magnetic phase. Accordingly, in various embodiments, a structure of the magnetostriction material of the drive rod 706 is randomly oriented and does not change its shape. In that regard, the length of the drive rod 706 does not change during non-magnetic phase and the spindle 708 stays in specified position due to the compression spring force 806. Accordingly, the distal end 804 of the spindle 708, which is coupled to the lacing loops of the soft cover 206 of FIG. 2 stays intact with the lacing 210 of FIG. 2 and thus, does not release lacing 210 of the soft cover 206.

Figure 9:
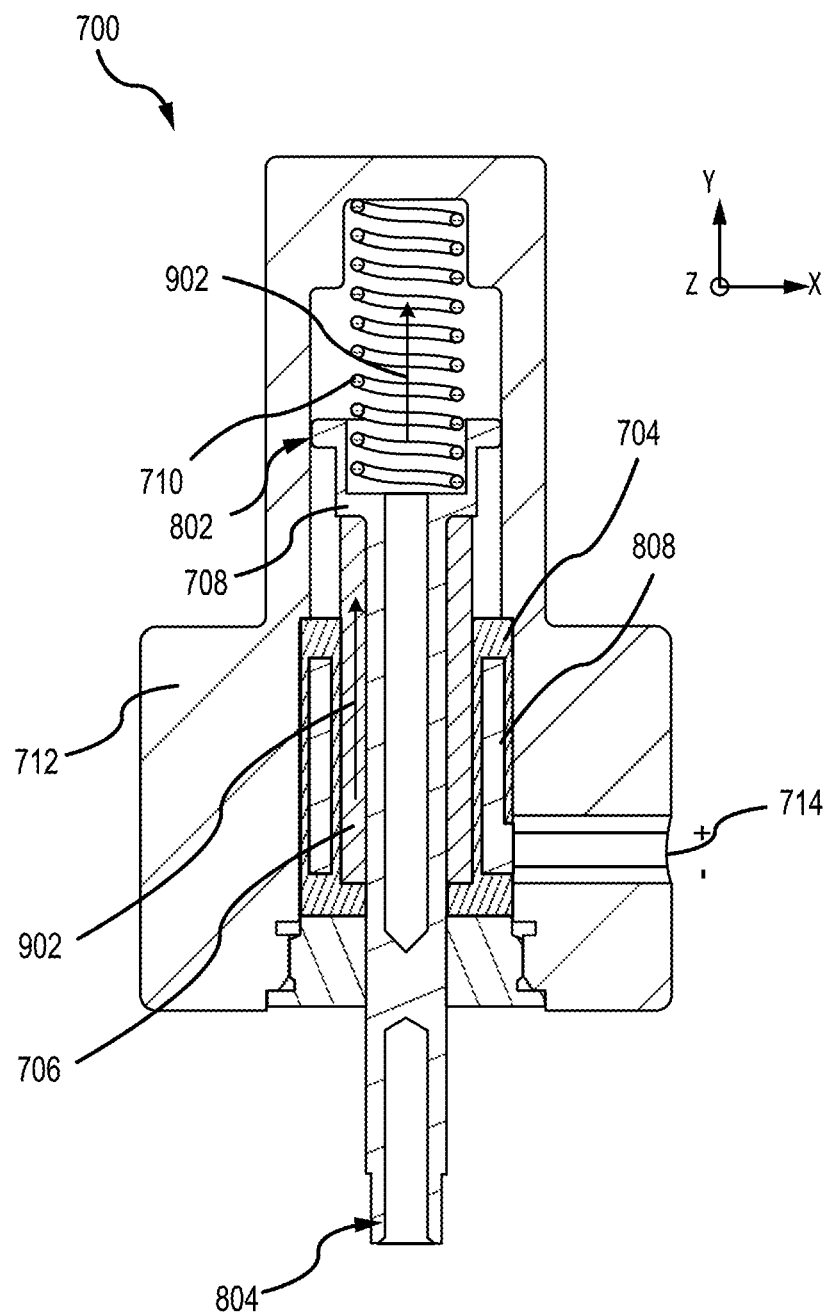
FIG. 9 illustrates a cross-sectional view of a pull pin assembly in an unlocked/released state, according to various embodiments.

Referring now to FIG. 9, in accordance with various embodiments, a cross-sectional view of a pull pin assembly in an unlocked/released state is illustrated. In various embodiments, in the unlocked/released state of the pull pin assembly 700, the controller is configured to provide an electrical signal to the direct current solenoid 808 within the magnetostrictive housing 704 via the electrical cable connection 714. In various embodiments, with the provided electrical signal, the direct current solenoid 808 generates a magnetic field onto the drive rod 706. In various embodiments, during the magnetic field phase, a structure of the magnetostriction material in the drive rod 706 changes orientation. In various embodiments, the orientation change imposed by the magnetic field generated by the direct current solenoid 808 creates a strain field in the magnetostriction material of the drive rod 706 and, as the intensity of the magnetic field is increased, more and more magnetic domains of magnetostriction material orientate themselves so that their principle axes of anisotropy are collinear with the magnetic field in each region and finally saturation is achieved. In various embodiments, the effect of this material property change in the magnetostriction material of the drive rod 706 during magnetic field phase causes the drive rod 706 to increase in length in a second direction 902 opposite to the compression spring force 806 of FIG. 5, i.e., in a positive y-direction, which increases a length of the drive rod 706 from its original length by reducing its diameter respectively.

In various embodiments, the elongation of the drive rod 706 in the second direction 902 causes the drive rod 706, which abuts the second face of the proximal end 802 of the spindle 708, to force the spindle 708 to translate in the second direction 902, i.e., in the positive y-direction, which compresses the compression spring 710 in the second direction 902, i.e., in the positive y-direction. In that regard, the longitudinal strain of in the magnetostriction material of the drive rod 706 produces the tensile force which creates the pushing force on the second face of the proximal end 802 of the spindle 708. Accordingly, due to this push force from drive rod 706, the proximal end 802 of the spindle 708 translates towards the compression spring 710 due to increase length of the drive rod 706. In various embodiments, the increased length of drive rod 706 generates a force that is higher than the compression spring force 806 such that the distal end 804 of the spindle 708 gradually moves into the actuator housing 712. In that regard, the displacement of the spindle 708 pulls the lacing 210 that is coupled to the distal end 804 of the spindle 708 thereby untying the lacing 210 of the soft cover 206 and facilitate the deployment of an evacuation slide.

Figure 10:
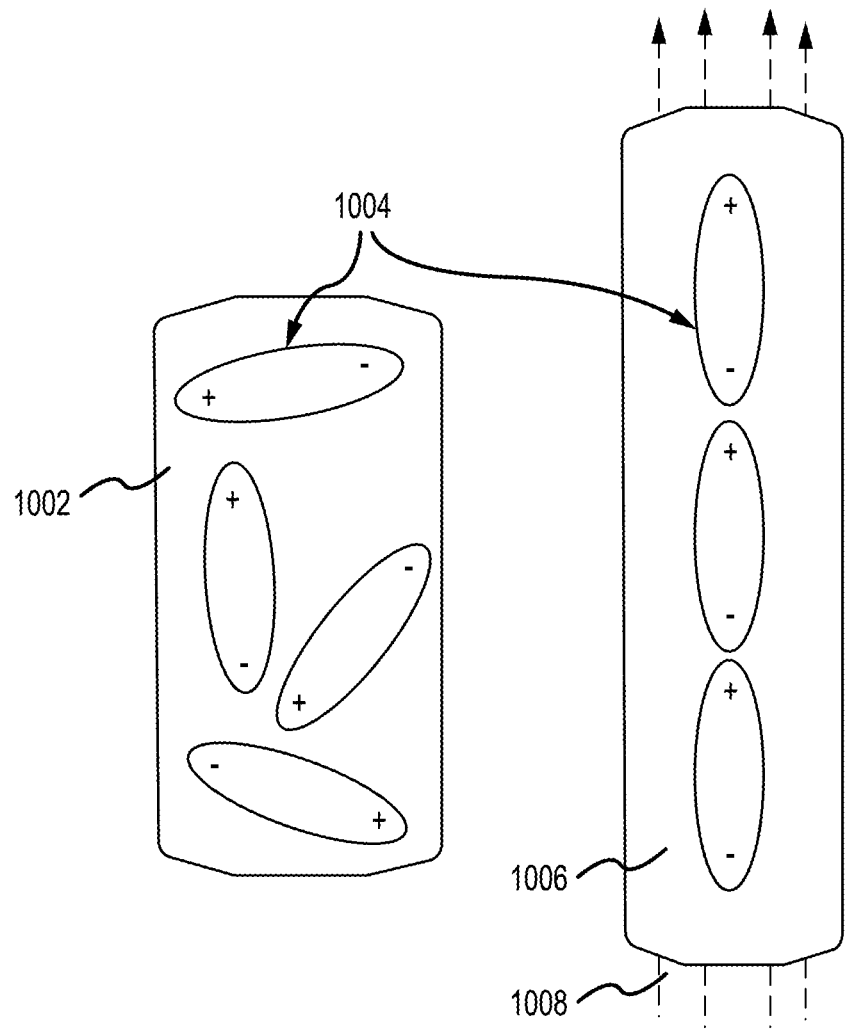
FIG. 10 illustrates properties of a magnetostriction material, according to various embodiments.

Referring now to FIG. 10, in accordance with various embodiments, properties of a magnetostriction material is illustrated. In non-magnetized magnetostriction material 1002, i.e., magnetostriction material that has not been exposed to an electrical signal and is in a non-magnetic phase, magnetic dipoles 1004 within the non-magnetized magnetostriction material 1002 are randomly oriented. In a magnetized magnetostriction material 1006, i.e., magnetostriction material that has been exposed to an electrical signal and is in magnetic phase, magnetic dipoles 1004 orientate themselves so that their principle axes of anisotropy are collinear with magnetic field 1008 in each region until saturation is achieved. In various embodiments, the effect of this material property change in the magnetized magnetostriction material 1006 during magnetic field phase causes the magnetostriction material 1006 to increase in length and decrease in width.

Figure 11:
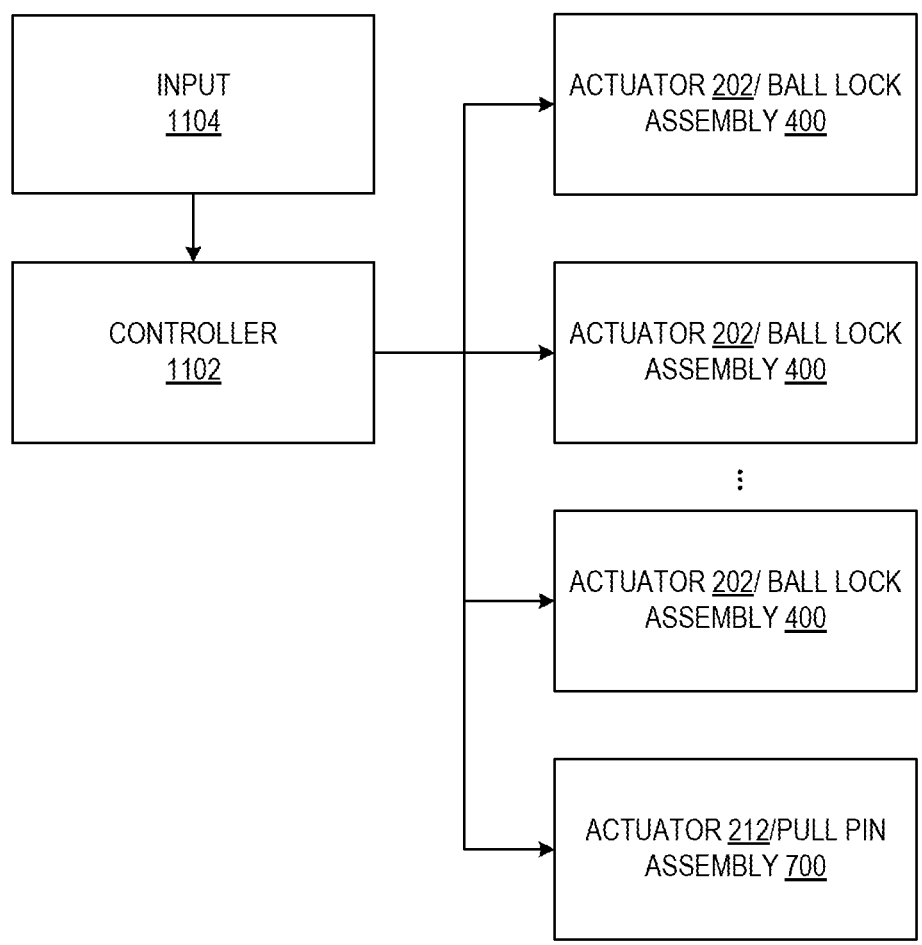
FIG. 11 illustrates a block diagram of a system for utilizing magnetostriction to control a blowout panel and softcover release of an aircraft, according to various embodiments.

Referring now to FIG. 11, in accordance with various embodiments, a block diagram of a system for utilizing magnetostriction to control a blowout panel and softcover release of an aircraft is illustrated. In various embodiments, controller 1102 receives input 1104 of an activated emergency exit door being opened, a signal from the cockpit of the aircraft, or other evacuation event, among others, that an evacuation event has begun. In response to the indication of an evacuation event, the controller 1102 is configured to provide a direct current signal to one or more first actuators, such as first actuator 202 of FIG. 2 or ball lock assembly 400 of FIGS. 4-6, the one or more first actuators operating in the manner described with respect to FIGS. 4-6. Additionally, in response to the indication of an evacuation event, the controller 1102 is configured to provide a direct current signal to a second actuator, such as the second actuator 212 of FIG. 2 or pull pin assembly 700 of FIGS. 7-9, the second actuator operating in the manner described with respect to FIGS. 7-9.

Figure 12:
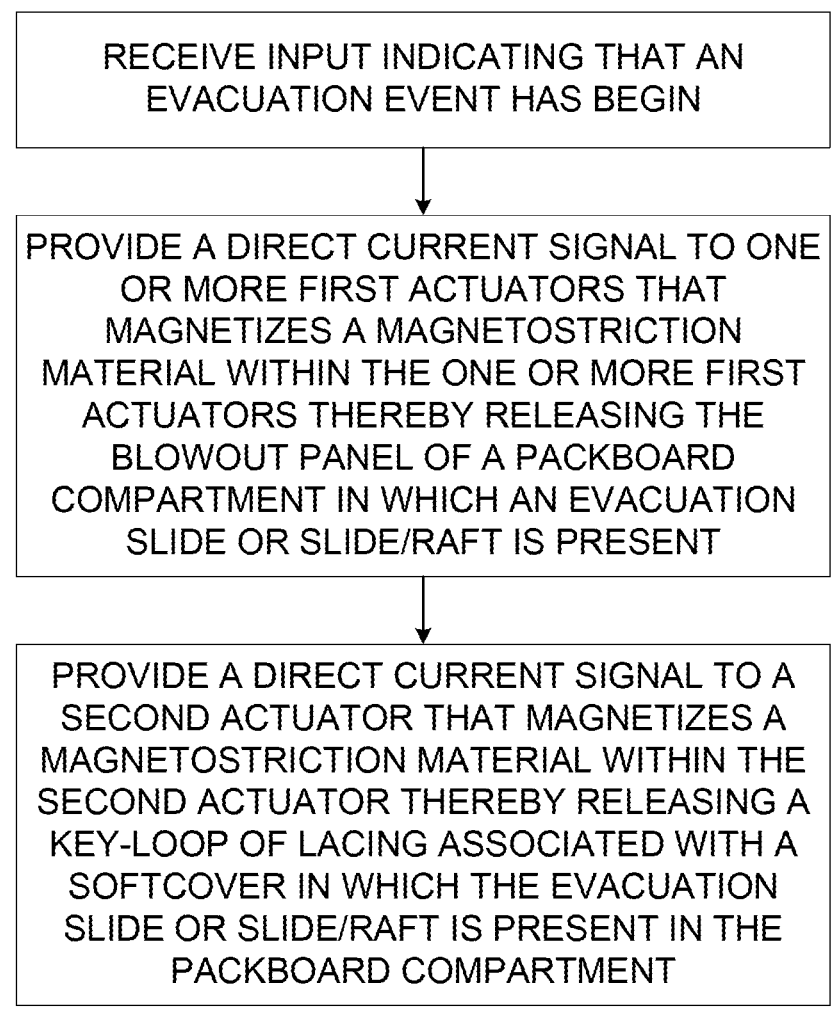
FIG. 12 illustrates a method for utilizing magnetostriction to control a blowout panel and softcover release of an aircraft, according to various embodiments.

Referring now to FIG. 12, in accordance with various embodiments, a method for utilizing magnetostriction to control a blowout panel and softcover release of an aircraft is illustrated. The method 1200 may be performed by a controller 1102 described above with respect to FIG. 11. At block 1202, the controller 1102 receives input of an activated emergency exit door being opened, a signal from the cockpit of the aircraft, or other evacuation event, among others, that an evacuation event is has begun. At block 1204, responsive to receiving input indicating an evacuation event, the controller 1102 is configured to provide a direct current signal to one or more first actuators that magnetizes a magnetostriction material within the one or more first actuators thereby releasing the blowout panel of a packboard compartment in which an evacuation slide or slide/raft is present. At block 1206, responsive to receiving input indicating an evacuation event, the controller 1102 is configured to provide a direct current signal to a second actuator that magnetizes a magnetostriction material within the second actuator thereby releasing a key-loop of lacing associated with a softcover in which the evacuation slide or slide/raft is present in the packboard compartment.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for releasing a blowout panel and softcover release of an evacuation slide in an aircraft, the system comprising:
    the blowout panel;
    the evacuation slide;
    a first actuator;
    a second actuator; and
    a controller, wherein the controller is configured to:
        receive an indication that an evacuation event has begun; and
        responsive to receiving the indication of the evacuation event beginning:
            send a first signal to the first actuator that magnetizes a first magnetostriction material within the first actuator, thereby releasing the blowout panel of a packboard compartment in which the evacuation slide is present; and
            send a second signal to the second actuator that magnetizes a second magnetostriction material within the second actuator, thereby releasing a key-loop of lacing associated with the softcover in which the evacuation slide is present in the packboard compartment,
    wherein the first actuator comprises:
        the first magnetostriction material;
        a spindle; and
        a set of ball bearings, wherein the first magnetostriction material, when magnetized, expands along a length of the first magnetostriction material in a first direction forcing the spindle to translate in the first direction thereby allowing the set of ball bearings holding the blowout panel in place to translate in a second direction perpendicular to the first direction thereby releasing the blowout panel.

2. The system of claim 1, wherein the first actuator is a set of first actuators.

3. The system of claim 1, wherein the first actuator further comprises:
    a compression spring, wherein the compression spring provides a compression spring force that holds the spindle against the first magnetostriction material.

4. The system of claim 1, wherein the first actuator further comprises:
    a solenoid, wherein the solenoid generates a magnetic field in response to receiving the first signal and wherein the magnetic field magnetizes the first magnetostriction material thereby expanding the first magnetostriction material along the length of the first magnetostriction material in the first direction.

5. The system of claim 1, wherein the first signal is a direct current signal.

6. The system of claim 1, wherein the second actuator comprises:
    the second magnetostriction material; and
    a spindle, wherein the second magnetostriction material, when magnetized, expands along a length of the second magnetostriction material in a first direction forcing the spindle to translate in the first direction thereby pulling the key-loop of the lacing coupled to the spindle.

7. The system of claim 6, wherein the second actuator further comprises:
a compression spring, wherein the compression spring provides a compression spring force that holds the spindle against the second magnetostriction material.

8. The system of claim 6, wherein the second actuator further comprises:
a solenoid, wherein the solenoid generates a magnetic field in response to receiving the second signal and wherein the magnetic field magnetizes the second magnetostriction material thereby expanding the second magnetostriction material along the length of the second magnetostriction material in the first direction.

9. The system of claim 1, wherein the second signal is a direct current signal.

10. A control system for releasing a blowout panel and softcover release of an evacuation slide in an aircraft, the control system comprising:
the blowout panel;
the evacuation slide;
a first actuator;
a second actuator;
a controller coupled to the first actuator and the second actuator; and
a tangible, non-transitory memory configured to communicate with the controller, the tangible, non-transitory memory having instructions stored thereon that, in response to execution by the controller, cause the controller to:
receive an indication that an evacuation event has begun; and
responsive to receiving the indication of the evacuation event beginning:
send a first signal to the first actuator that magnetizes a first magnetostriction material within the first actuator, thereby releasing the blowout panel of a packboard compartment in which the evacuation slide is present; and
send a second signal to the second actuator that magnetizes a second magnetostriction material within the second actuator, thereby releasing a key-loop of lacing associated with the softcover in which the evacuation slide is present in the packboard compartment,
wherein the first actuator comprises:
the first magnetostriction material;
a spindle; and
a set of ball bearings, wherein the first magnetostriction material, when magnetized, expands along a length of the first magnetostriction material in a first direction forcing the spindle to translate in the first direction thereby allowing the set of ball bearings holding the blowout panel in place to translate in a second direction perpendicular to the first direction thereby releasing the blowout panel.

11. The control system of claim 10, wherein the first actuator is a set of first actuators.

12. The control system of claim 10, wherein the first actuator further comprises:
a compression spring, wherein the compression spring provides a compression spring force that holds the spindle against the first magnetostriction material.

13. The control system of claim 10, wherein the first actuator further comprises:
a solenoid, wherein the solenoid generates a magnetic field in response to receiving the first signal and wherein the magnetic field magnetizes the first magnetostriction material thereby expanding the first magnetostriction material along the length of the first magnetostriction material in the first direction.

14. The control system of claim 10, wherein the second actuator comprises:
the second magnetostriction material; and
a spindle,
wherein the second magnetostriction material, when magnetized, expands along a length of the second magnetostriction material in a first direction forcing the spindle to translate in the first direction thereby pulling the key-loop of the lacing coupled to the spindle.

15. The control system of claim 14, wherein the second actuator further comprises:
a compression spring, wherein the compression spring provides a compression spring force that holds the spindle against the second magnetostriction material.

16. The control system of claim 14, wherein the second actuator further comprises:
a solenoid, wherein the solenoid generates a magnetic field in response to receiving the second signal and wherein the magnetic field magnetizes the second magnetostriction material thereby expanding the second magnetostriction material along the length of the second magnetostriction material in the first direction.

17. The control system of claim 10, wherein the first signal and the second signal are direct current signals.

18. A method for releasing a blowout panel and softcover release of an evacuation slide in an aircraft, the method comprising:
receiving, by a controller, an indication that an evacuation event has begun; and
responsive to receiving the indication of the evacuation event beginning:
sending, by the controller, a first signal to a first actuator that magnetizes a first magnetostriction material within the first actuator, thereby releasing the blowout panel of a packboard compartment in which the evacuation slide is present; and
sending, by the controller, a second signal to a second actuator that magnetizes a second magnetostriction material within the second actuator, thereby releasing a key-loop of lacing associated with the softcover in which the evacuation slide is present in the packboard compartment.

* * * * *